United States Patent
Saver et al.

(10) Patent No.: US 7,033,485 B2
(45) Date of Patent: Apr. 25, 2006

(54) COAL TAR AND HYDROCARBON MIXTURE PITCH PRODUCTION USING A HIGH EFFICIENCY EVAPORATIVE DISTILLATION PROCESS

(75) Inventors: William E. Saver, Natrona Heights, PA (US); E. Ronald McHenry, Berea, OH (US)

(73) Assignee: Koppers Industries of Delaware, Inc., Pittsburgh, PA (US)

( * ) Notice: Subject to any disclaimer, the term of this patent is extended or adjusted under 35 U.S.C. 154(b) by 713 days.

(21) Appl. No.: 09/853,372

(22) Filed: May 11, 2001

(65) Prior Publication Data

US 2002/0185411 A1 Dec. 12, 2002

(51) Int. Cl.
*C10C 1/19* (2006.01)
*C10C 3/00* (2006.01)
*C10C 1/04* (2006.01)

(52) U.S. Cl. .............. 208/41; 208/40; 208/39; 208/42; 208/44

(58) Field of Classification Search .......... 208/39, 208/40, 41, 42, 44
See application file for complete search history.

(56) References Cited

U.S. PATENT DOCUMENTS

| | | | |
|---|---|---|---|
| 3,846,362 A | 11/1974 | Reincke et al. | |
| 4,093,479 A | 6/1978 | Baird | 159/6 |
| 4,193,900 A | 3/1980 | Whittington et al. | |
| 4,466,932 A | 8/1984 | Koyama et al. | |
| 4,497,789 A | 2/1985 | Sawran et al. | |
| 4,670,129 A | 6/1987 | Tate et al. | |
| 4,671,864 A | 6/1987 | Sawran et al. | |
| 4,844,740 A | 7/1989 | Chiu | |
| 4,921,539 A | 5/1990 | Harlin et al. | |
| 4,927,620 A | 5/1990 | Ward et al. | |
| 4,929,404 A | 5/1990 | Takahashi et al. | |
| 4,971,679 A | 11/1990 | Lewis et al. | |
| 5,128,021 A * | 7/1992 | Romey et al. | 208/39 |
| 5,182,011 A | 1/1993 | Tsuchitani et al. | |
| 5,217,657 A | 6/1993 | Engle | |
| 5,259,947 A | 11/1993 | Kalback et al. | |
| 5,262,043 A * | 11/1993 | Boenigk et al. | 208/41 |
| 5,334,414 A | 8/1994 | Edie et al. | |
| 5,360,848 A * | 11/1994 | Kuechler et al. | 524/59 |
| 5,413,738 A | 5/1995 | Lewis et al. | |
| 5,429,739 A | 7/1995 | Hanks et al. | 208/4 |
| 5,476,542 A | 12/1995 | Doyle et al. | |
| 5,489,374 A | 2/1996 | Romine et al. | |
| 5,501,729 A | 3/1996 | Lewis et al. | 106/274 |
| 5,525,558 A | 6/1996 | Niwa et al. | |
| 5,531,943 A | 7/1996 | Sudani et al. | |
| 5,534,133 A | 7/1996 | Lewis et al. | 208/39 |
| 5,538,621 A | 7/1996 | Kalback et al. | |
| 5,607,770 A | 3/1997 | Lewis et al. | |
| 5,614,164 A | 3/1997 | Sumner et al. | |
| 5,688,155 A | 11/1997 | Lewis et al. | |
| 5,736,030 A | 4/1998 | Tsuchitani et al. | |
| 5,740,593 A | 4/1998 | Sheehan et al. | |
| 5,746,906 A | 5/1998 | McHenry et al. | 208/22 |
| 5,753,018 A | 5/1998 | Lamport et al. | |
| 5,843,298 A | 12/1998 | Orac et al. | 208/42 |
| 5,889,081 A | 3/1999 | Kakegawa et al. | |
| 5,910,383 A | 6/1999 | Hase et al. | |
| 6,094,338 A | 7/2000 | Hirahara et al. | |
| 6,129,868 A | 10/2000 | Penkov | |
| 6,237,203 B1 | 5/2001 | Sheehan et al. | |
| 6,267,809 B1 | 7/2001 | Boyer et al. | |
| 6,319,392 B1 | 11/2001 | Navarro | |

FOREIGN PATENT DOCUMENTS

| | | |
|---|---|---|
| DE | 37 02720 C2 | 8/1988 |
| DE | 41 12 955 A1 | 10/1993 |
| EP | 0 957 150 A1 | 11/1999 |
| JP | 58-132079 | 5/1977 |
| JP | 62-116688 | 8/1983 |
| JP | 2-502648 | 8/1990 |
| JP | 5-125366 | 5/1993 |
| JP | 52-62329 | 1/1996 |
| JP | 8-500383 | 1/1996 |

OTHER PUBLICATIONS

"Polycyclic Aromatic Hydrocarbons (PAH's) in Pitches Used in the Aluminum Industry," A. Mirtchi & L. Noel, pp. 794–795, Carbon '94, Granada, Spain (1994).

* cited by examiner

*Primary Examiner*—Walter D. Griffin
*Assistant Examiner*—Tam M. Nguyen
(74) *Attorney, Agent, or Firm*—Reed Smith LLP

(57) ABSTRACT

Described are methods that utilize high efficiency evaporative distillation to make a high softening point coal tar pitch, a quinoline insoluble-free and ash-free coal tar pitch having a desired softening point, and a mesophase coal tar pitch. Each of the methods uses a feed coal tar pitch having a softening point in the range of 70° C. to 160° C. The methods may be carried out using appropriate conventional distillation equipment, a wiped film evaporator, or a thin film evaporator.

46 Claims, No Drawings

COAL TAR AND HYDROCARBON MIXTURE PITCH PRODUCTION USING A HIGH EFFICIENCY EVAPORATIVE DISTILLATION PROCESS

FIELD OF THE INVENTION

The present invention relates to the distillation of coal tar pitch or other coal derived streams for the production of coal tar and hydrocarbon mixture pitches and other by-products, and in particular to the production of coal tar hydrocarbon mixture distillates and residues using a high efficiency evaporative distillation process.

BACKGROUND AND DESCRIPTION OF THE PRIOR ART

Coal tar is a primary by-product material produced during the destructive distillation or carbonization of coal into coke. While the coke product is utilized as a fuel and reagent source in the steel industry, the coal tar material is distilled into a series of fractions, each of which are commercially viable products in their own right. A significant portion of the distilled coal tar material is the pitch residue. This material is utilized in the production of anodes for aluminum smelting, as well as electrodes for electric arc furnaces used in the steel industry. In evaluating the qualitative characteristics of the pitch material, the prior art has been primarily focused on the ability of the coal tar pitch material to provide a suitable binder used in the anode and electrode production processes. Various characteristics such as softening point, specific gravity, percentage of material insoluble in quinoline, also known as QI, and coking value have all served to characterize coal tar pitches for applicability in these various manufacturing processes and industries.

Softening point is the basic measurement utilized to determine the distillation process end point in coal tar pitch production and to establish the mixing, forming or impregnating temperatures in carbon product production. All softening points referred to herein are taken according to the Mettler method or ASTM Standard D3104. Additional characteristics described herein include QI, which is utilized to determine the quantity of solid and high molecular weight material in the pitch. QI may also be referred to as α-resin and the standard test methodology used to determine the QI as a weight percentage include either ASTM Standard D4746 or ASTM Standard D2318. Percentage of material insoluble in toluene, or TI, will also be referred to herein, and is determined through ASTM Standard D4072 or D4312.

Mirtchi and Noel, in a paper presented at Carbon '94 at Granada, Spain, entitled "Polycyclic Aromatic Hydrocarbons in Pitches Used in the Aluminum Industry," described and categorized the PAH content of coal tar pitches. These materials were classified according to their carcinogenic or mutagenic effect on living organisms. The paper identified 14 PAH materials which are considered by the United States Environmental Protection Agency to be potentially harmful to public health. Each of the 14 materials is assigned a relative ranking of carcinogenic potency which is based on a standard arbitrary assignment of a factor of 1 to benzo(a) pyrene or B(a)P. Estimations of potential toxicity of a pitch material may be made by converting its total PAH content into a B(a)P equivalent which eliminates the necessity of referring to each of the 14 materials individually, providing a useful shorthand for the evaluation of a material's toxicity.

A typical coal tar binder pitch is characterized as shown in Table I.

TABLE I

| | |
|---|---|
| Softening Point, ° C. | 111.3 |
| Toluene Insolubles, wt. % | 28.1 |
| Quinoline Insolubles, wt. % | 11.9 |
| Coking Value, Modified Conradson, wt. % | 55.7 |
| Ash, wt. % | 0.21 |
| Specific Gravity, 25/25° C. | 1.33 |
| Sulfur, wt. % | 0.6 |
| B(a)P Equivalent, ppm | 27,500 |

Two shortcomings with respect to the use of coal tar pitch in general, and more specifically in the aluminum industry, have recently emerged. The first is a heightened sensitivity to the environmental impact of this material and its utilization in aluminum smelting anodes. The other is a declining supply of crude coal tar from the coke-making process. Significant reductions in coke consumption, based upon a variety of factors, has reduced the availability of crude coal tar. This reduction in production of these raw materials is expected to escalate in the near future and alternative sources and substitute products have been sought for some period. No commercially attractive substitute for coal tar pitch in the aluminum industry has been developed, however.

There are two common methods of distilling coal tar, continuous and batch. Continuous distillation involves a constant feeding of the material to be distilled, i.e., coal tar, and the constant removal of the product or residue, i.e., coal tar pitch. Traditional continuous distillations are typically performed at pressures of between 45 mmHg and 60 mmHg and at temperatures of between 390° C. and 400° C. and are typically able to produce a coal tar pitch having a maximum softening point of approximately 140° C. Batch distillation can be thought of as taking place in a crucible, much like boiling water. High heat levels are developed as a result of the longer residence time of the coal tar in the crucible. Although higher softening points of up to 180° C. can be reached using batch distillation, the combination of high heat and longer residence time can often lead to decomposition of the coal tar pitch and the formation of unwanted mesophase pitch. Processing times for the distillation of coal tar using known continuous and batch distillation range from several minutes to several hours depending upon the coal tar pitch product to be produced.

High efficiency evaporative distillation processes are known that subject a material to elevated temperatures, generally in the range of 300° C. to 600° C., and reduced pressures generally in the range of 5 Torr or less, in a distillation vessel to evolve lower molecular weight, more volatile components from higher molecular weight, less volatile components. Such high efficiency evaporative distillation processes may be carried out using conventional distillation equipment having enhanced vacuum capabilities for operating at the above specified temperature and pressure ranges. In addition, high efficiency evaporative distillation processes may be carried out in an apparatus known as a wiped film evaporator, or WFE, and thus such processes are commonly referred to as WFE processes. Similarly, high efficiency evaporative distillation processes may be carried out in an apparatus known as a thin film evaporator, and thus such processes are commonly referred to as thin film evaporator processes. WFE and thin film evaporator processes are often used as efficient, relatively quick ways to continuously distill a material. Generally, WFE and thin film evaporator processes involve forming a thin layer of a material on a heated surface, typically the interior wall of a vessel or chamber, generally in the range of 300° C. to 600° C., while simultaneously providing a reduced pressure, generally in the range of 5 Torr or less. In a WFE process, the thin layer of material is formed by a rotor in close proximity with the interior wall of the vessel. In contrast, in a thin film evaporator process, the thin film evaporator typically has a spinner configuration such that the thin layer of material is formed on the interior wall of the vessel as a result of centrifugal force. WFE and thin film evaporator processes are continuous processes as they involve the continuous ingress of feed material and egress of output material. Both wiped film evaporators and thin film evaporators are well known in the prior art.

One prior art WFE apparatus is described in Baird, U.S. Pat. No. 4,093,479. The apparatus described in Baird includes a cylindrical processing chamber or vessel. The processing chamber is surrounded by a temperature control jacket adapted to introduce a heat exchange fluid. The processing chamber includes a feed inlet at one end and a product outlet at the opposite end.

The processing chamber of the apparatus described in Baird also includes a vapor chamber having a vapor outlet. A condenser and a vacuum means may be placed in communication with the vapor outlet to permit condensation of the generated vapor under sub-atmospheric conditions. Extending from one end of the processing chamber to the other end is a tube-like motor-driven rotor. Extending axially outward from the rotor shaft are a plurality of radial rotor blades which are non-symmetrically twisted to extend radially from one end of the chamber to the other between the feed inlet and the product outlet. The rotor blades extend into a small but generally uniform closely spaced thin-film relationship with respect to the interior wall of the processing chamber so that, when the rotor rotates, the rotor blades provide a thin, wiped or turbulent film of the processing material on the interior wall of the processing chamber.

In operation, a material to be processed is introduced into the feed inlet by a pump or by gravity. The material is permitted to move downwardly and is formed into a thin-film on the interior wall of the processing chamber by the rotating rotor blades. A heat-exchange fluid, such as steam, is introduced into the temperature control jacket so that the interior wall of the processing chamber is heated to a steady, pre-selected temperature to effect the controlled evaporation of the relatively volatile component of the processing material. A relatively non-volatile material is withdrawn from the product outlet, and the vaporized volatile material is withdrawn from the vapor chamber through the vapor outlet.

SUMMARY OF THE INVENTION

The present invention relates to a method of making a high softening point coal tar pitch using high efficiency evaporative distillation. According to the method, a feed coal tar pitch having a softening point in the range of 70° C. to 160° C. is fed into a processing vessel wherein the processing vessel is heated to a temperature in the range of 300° C. to 600° C. and wherein a pressure inside the processing vessel is in the range of 5 Torr or less. An output coal tar pitch is withdrawn from the processing vessel. The output coal tar pitch has a softening point in the range of 140° C. to 300° C. and has less than 5% mesophase. A mesophase content of greater than 5% in the output coal tar pitch will degrade its performance as a binder for carbon-carbon composites and friction materials, and in the production of graphite electrodes and anodes used for aluminum production. Preferable ranges for the output coal tar pitch include a softening point in the range of 150° C. to 250° C. and less than 1% mesophase. Also, the output coal tar pitch preferably has a B(a)P Equivalent less than or equal to 500 ppm. The feed coal tar pitch may preferably have a softening point in the range of 110° C. to 140° C., and the processing vessel may preferably be heated to a temperature in the range of 350° C. to 500° C. The output coal tar pitch may also be combined with a plasticizer such as a low viscosity, preferably between 2 and 5 centistokes at 210° F., low B(a)P equivalent, preferably no more than 500 ppm B(a)P, coal tar, or such a coal tar in combination with a petroleum oil where the petroleum oil constitutes 30% to 60% of the mixture.

The present invention also relates to a method of making a quinoline insoluble-free and ash-free coal tar pitch having a desired softening point. According to the method, a feed coal tar pitch having a softening point in the range of 70° C. to 160° C. is fed into a processing vessel, wherein the processing vessel is heated to a temperature in the range of 300° C. to 600° C. and wherein a pressure inside the processing vessel is in the range of 5 Torr or less. A quinoline insoluble-free and ash-free distillate having a softening point in the range of 25° C. to 60° C. is obtained from the processing vessel. The distillate is heat treated at a temperature in the range of 350° C. to 595° C. for between five minutes and forty hours. The heat treated distillate may then be distilled to obtain a pitch having the desired softening point.

The present invention also relates to a method of making a mesophase coal tar pitch having 70% to 100% mesophase. According to this method, a feed coal tar pitch having a softening point in the range of 70° C. to 160° C. is fed into a processing vessel, wherein the processing vessel is heated to a temperature in the range of 300° C. to 600° C. and wherein a pressure inside the processing vessel is in the range of 5 Torr or less. A quinoline insoluble-free and ash-free distillate having a softening point in the range of 25° C. to 60° C. is obtained from the processing vessel. The distillate is heat treated at a temperature in the range of 370° C. to 595° C. for between three and forty hours.

The present invention also relates to a method of making a quinoline insoluble-free and ash-free coal tar pitch. The method includes steps of feeding a feed coal tar pitch having a softening point in the range of 70° C. to 160° C. into a first processing vessel, wherein the first processing vessel is heated to a temperature in the range of 300° C. to 600° C. and wherein a pressure inside the first processing vessel is in the range of 5 Torr or less, obtaining a quinoline insoluble-free and ash-free distillate having a softening point in the range of 25° C. to 60° C. from the first processing vessel, heat treating the distillate at a temperature in the range of 350° C. to 595° C. for between five minutes and forty hours, distilling the heat treated distillate to obtain a pitch having a desired softening point, feeding the pitch having a desired softening point into a second processing vessel, wherein the second processing vessel is heated to a temperature in the range of 300° C. to 600° C., and withdrawing an output coal tar pitch from the second processing vessel. The first and second processing vessel may be the same vessel, or may be different vessels.

Alternatively, a hydrocarbon mixture, such as a mixture of coal tar pitch and petroleum pitch, may be used as a feed material in place of the feed coal tar pitch in each of the methods of the present invention. The hydrocarbon mixture preferably has a coal tar pitch content of at least 50%.

Each of the methods of the present invention may be performed using conventional distillation equipment having the ability to operate at the specified temperatures and pressures, a wiped film evaporator, or a thin film evaporator.

DESCRIPTION OF THE PREFERRED EMBODIMENTS

According to the present invention, a high softening point, low volatility coal tar pitch is produced by processing a feed coal tar pitch having a softening point in the range of 70° C. to 160° C., and preferably in the range of 110° C. to 140° C., using a high efficiency evaporative distillation process carried out in a processing vessel operating at temperatures of 300° C. to 600° C. and pressures of 5 Torr or less. This temperature range is important because operating below the bottom temperature will not yield the desired softening point in the output material and operating above the top temperature will result in thermal cracking and thermal degradation in the output material. Similarly, this pressure range is important because if the pressure is higher than the specified top range pressure, higher operating temperatures will be necessary to achieve the desired softening point, which higher temperatures will result in thermal cracking and thermal degradation in the output material.

According to the present invention, the processing may be performed using a WFE apparatus, and for purposes of illustration and not limitation, the present invention will be described with respect to processing using a WFE apparatus. It will be appreciated, however, that conventional distillation equipment and conventional thin film evaporators may be used so long as such equipment and evaporators may be operated at the temperatures and pressures described herein. In the case where a thin film evaporator is used, the thin film evaporator preferably should form a film on the interior wall thereof having a minimum thickness that is no smaller than the thickness of the largest QI particle contained in the feed material.

Any known WFE apparatus may be used as long as it is capable of operating at temperatures of 300° C. to 600° C. and pressures of 5 Torr or less. Preferably, the WFE apparatus should be capable of processing a minimum film thickness of 1 millimeter, and operating with a wiper speed of 200 rpm to 3000 rpm. The processing chamber or vessel wall of the WFE is heated to a temperature of between 300° C. and 600° C., and preferably between 350° C. to 500° C. The appropriate feed rate of the feed coal tar pitch into the WFE apparatus will depend on the processing surface area of the vessel. The feed rate should be between 10 and 100 pounds/square foot of surface area/hour, and preferably between 35 and 50 pounds/square foot of surface area/hour. If the feed coal tar pitch is fed into the WFE apparatus at the rate of between 10 and 100 pounds/square foot of surface area/hour, the residence time of the feed coal tar pitch in the WFE apparatus will be approximately 1 to 60 seconds. If the feed coal tar pitch is fed at the preferred rate of between 35 and 50 pounds/square foot/hour, the residence time of the feed coal tar pitch in the WFE apparatus will be approximately 5 to 30 seconds. The residue of the WFE will be an output coal tar pitch having a softening point in the range of 140° C. to 300° C., preferably 150° C. to 250° C., and having a minimal formation of mesophase of 0% to 5%, preferably 0% to 1%. In the case where conventional distillation equipment adapted to operate at the specified temperatures and pressures is used, the output coal tar pitch will have a softening point in the range of 140° C. to 180° C. In order to achieve softening points in the output coal tar pitch in excess of 180° C. according to the present invention, it is necessary to use a WFE or a thin film evaporator, as the residence time required to produce softening points in the output coal tar pitch in excess of 180° C. using a conventional distillation apparatus will yield unwanted results such as the production of excess mesophase. Also, use of a high efficiency evaporative distillation process such as a WFE process facilitates the removal of high boiling point PAH's, particularly benzo(a)pyrene, from the feed coal tar pitch, resulting in an output coal tar pitch having a B(a)P equivalent of no more than 500 ppm. The yield of the output coal tar pitch at a given vessel temperature depends on the softening point of the feed coal tar pitch.

EXAMPLES

Further details of the present invention are shown in the following examples:

Example 1

A feed coal tar pitch having a softening point of 109° C. is fed into a WFE apparatus having a 1.4 square foot vessel operating at a temperature of 335° C. at a feed rate of 77 pounds/square foot of surface area/hour. The output coal tar pitch of the WFE apparatus has a pitch yield of 85%. A laboratory analysis of the output coal tar pitch is summarized in the following Table II:

TABLE II

| | |
|---|---|
| Softening Point, ° C. | 140.6 |
| Toluene Insolubles, wt. % | 32.9 |
| Quinoline Insolubles, wt. % | 15.1 |
| Coking Value, Modified Conradson, wt. % | 64.9 |
| Ash, wt. % | 0.20 |
| Specific Gravity, 25/25° C. | 1.35 |
| Beta Resin, wt. % | 17.8 |

Example 2

A feed coal tar pitch having a softening point of 109° C. is fed into a WFE apparatus having a 1.4 square foot vessel operating at a temperature of 335° C. at a feed rate of 95 pounds/square foot/hour. The output coal tar pitch of the WFE apparatus has a pitch yield of 73%. A laboratory analysis of the output coal tar pitch is summarized in the following Table III:

TABLE III

| | |
|---|---|
| Softening Point, ° C. | 163.0 |
| Toluene Insolubles, wt. % | 37.7 |
| Quinoline Insolubles, wt. % | 17.0 |
| Coking Value, Modified Conradson, wt. % | 71.6 |
| Ash, wt. % | 0.22 |
| Specific Gravity, 25/25° C. | 1.36 |
| Beta Resin, wt. % | 20.7 |

Example 3

A feed coal tar pitch having a softening point of 109° C. is fed into a WFE apparatus having a 1.4 square foot vessel operating at a temperature of 350° C. at a feed rate of 65 pounds/square foot/hour. The output coal tar pitch of the WFE apparatus has a pitch yield of 74.2%. A laboratory analysis of the output coal tar pitch is summarized in the following Table IV:

TABLE IV

| | |
|---|---|
| Softening Point, ° C. | 200.0 |
| Toluene Insolubles, wt. % | 42.2 |
| Quinoline Insolubles, wt. % | 18.2 |
| Coking Value, Modified Conradson, wt. % | 76.5 |
| Ash, wt. % | 0.27 |
| Specific Gravity, 25/25° C. | 1.378 |
| Beta Resin, wt. % | 24.1 |

Example 4

A feed coal tar pitch having a softening point of 109° C. is fed into a WFE apparatus having a 1.4 square foot vessel operating at a temperature of 365° C. at a feed rate of 67 pounds/square foot/hour. The output coal tar pitch of the WFE apparatus has a pitch yield of 67%. A laboratory analysis of the output coal tar pitch is summarized in the following Table V:

TABLE V

| | |
|---|---|
| Softening Point, ° C. | 225 |
| Toluene Insolubles, wt. % | 48.9 |
| Quinoline Insolubles, wt. % | 23.3 |
| Coking Value, Modified Conradson, wt. % | 81.2 |
| Ash, wt. % | 0.24 |
| Specific Gravity, 25/25° C. | 1.365 |
| Beta Resin, wt. % | 25.7 |

The output coal tar pitch having a softening point in the range of 140° C. to 300° C., and preferably in the range of 150° C. to 250° C., may be used as a binder for carbon-carbon composites and friction materials, and in the production of graphite electrodes and anodes used for aluminum production. In addition, the output coal tar pitch having a softening point in the range of 140° C. to 300° C., and preferably in the range of 150° C. to 250° C., may be combined with a plasticizer to produce a pitch having a 110° C. softening point suitable for use in aluminum anode production, including Soderberg binder pitch, and any other industrial application where very low PAH contents are required. The plasticizer may be low viscosity, preferably between 2 and 5 centistokes at 210° F., low B(a)P equivalent, preferably no more than 500 ppm B(a)P, coal tar, or such a coal tar in combination with a petroleum oil where the petroleum oil constitutes 30% to 60% of the mixture. One suitable plasticizer is the coal tar pitch blend described in McHenry et al., U.S. Pat. No. 5,746,906, the disclosure of which is incorporated herein by reference.

Alternatively, according to an alternate embodiment of the present invention, a hydrocarbon mixture, such as a mixture of coal tar pitch and petroleum pitch, may be used as a feed material in place of the feed coal tar pitch. The hydrocarbon mixture in this embodiment preferably has a coal tar pitch content of at least 50%. The distillate produced when using a hydrocarbon mixture as the feed material may then be used in the methods described below.

The distillate evolved by processing the feed coal tar pitch in the WFE apparatus will be quinoline insoluble-free, which as used herein means it has a QI in the range of 0% to 0.5%, and ash-free, which as used herein means it has an ash content in the range of 0% to 0.1%. A quinoline insoluble-free, ash free distillate is desirable for at least two reasons. First, the distillate may be used to create materials that will be used as an impregnating pitch to fill in porosity in carbon structures, and it is known that QI and ash hinders the ability to fill in such porosity. Second, the distillate may be used to create mesophase pitch, and QI is known to hinder the coalescence of mesophase spheres. The distillate will comprise a pitch having a softening point in the range of 25° C. to 60° C.

The distillate may be used to produce a quinoline insoluble-free and ash-free pitch of a desired higher softening point by first heat treating the distillate at temperatures between 350° C. and 595° C. for between 5 minutes and 40 hours The heat treating step may, for example, be performed by placing the distillate in a flask containing a short distillation column, and heating and stirring the distillate therein under a slight vacuum of no more than 600 mmHg Absolute. The step of heat treating the distillate will result in a pitch having a softening point in the range of 60° C. to 110° C. The heat treated distillate may then be distilled by known conventional means to obtain a pitch residue of a desired softening point. The resulting pitch may be used in the production of carbon fibers and fuel cells. As an alternative, a narrow boiling range quinoline insoluble free pitch may be produced by further processing the quinoline insoluble-free and ash-free pitch produced through heat treating and distillation using a high efficiency evaporative distillation process, such as a WFE or a thin film evaporator process, at temperatures in the range of 300° C. to 600° C. and pressures no greater than 5 Torr, wherein the narrow boiling range pitch is the residue of such processing.

EXAMPLE

Further details of the present invention are shown in the following example:

Example 1

A 25–30° C. softening point distillate produced from a feed coal tar pitch having a softening point of 110° C. is heat treated at 360° C. for approximately 8 hours to produce a pitch having a softening point of 60° C. The 60° C. softening point pitch is distilled in a batch/pot distillation at an overhead temperature of 400° C. to produce a pitch having a softening point of 98.9° C. with a 70% yield. A laboratory analysis of the resulting pitch is summarized in the following Table VI:

TABLE VI

| | |
|---|---|
| Toluene Insolubles, wt. % | 18.3 |
| Quinoline Insolubles, wt. % | 0.5 |
| Coking Value, Modified Conradson, wt. % | 46 |
| Ash, wt. % | 0.04 |
| Specific Gravity, 25/25° C. | 1.29 |
| Beta Resin, wt. % | 17.8 |

Alternatively, a mesophase pitch having mesophase content in the range of 70% to 100%, and preferably in the range of 75% to 85%, may be produced from the distillate by heat treating the distillate at temperatures between 370° C. and 595° C. for between 3 and 40 hours. The yield of the mesophase pitch is generally in the range of 70% and 100%. The mesophase pitch may be used in carbon fibers, lithium batteries and graphite foam. If the mesophase content is below 70%, the resultant product produced from the mesophase pitch will not have the necessary planar structure, resulting in a finished product with unacceptably low strength.

The terms and expression which have been employed herein are used as terms of description and not as limitation, and there is no intention in the use of such terms and expressions of excluding equivalents of the features shown and described or portions thereof, it being recognized that various modifications are possible within the scope of the invention claimed. Although particular embodiments of the present invention have been illustrated in the foregoing detailed description, it is to be further understood that the present invention is not to be limited to just the embodiments disclosed, but that they are capable of numerous rearrangements, modifications and substitutions.

What is claimed is:

1. A method of making a quinoline insoluble-free and ash-free coal tar pitch having a desired softening point, comprising the steps of: feeding a feed coal tar pitch having an initial softening point in the range of 70° C. to 160° C. into a processing vessel, wherein said processing vessel is heated to a temperature in the range of 300° C. to 600° C. and wherein a pressure inside said processing vessel is 5 Torr or less; obtaining a distillate from said processing vessel, said distillate having a softening point in the range of 25° C. to 60° C. and being quinoline insoluble-free and ash-free; heat treating said distillate at a temperature in the range of 350° C. to 595° C. for between five minutes and forty hours; and distilling the heat treated distillate to obtain a pitch having the desired softening point.

2. A method according to claim 1, said feeding step comprising introducing said feed coal tar pitch into a wiped film evaporator, said wiped film evaporator comprising said processing vessel.

3. A method according to claim 1, said feeding step comprising introducing said feed coal tar pitch into a thin film evaporator, said thin film evaporator comprising said processing vessel.

4. A method according to claim 1, said feeding step comprising introducing said feed coal tar pitch into a conventional distillation apparatus, said conventional distillation apparatus comprising said processing vessel.

5. A method according to claim 1, wherein said heat treated distillate has a softening point in the range of 60° C. to 110° C.

6. A method of making a mesophase coal tar pitch, comprising of the steps of: feeding a feed coal tar pitch having a softening point in the range of 70° C. to 160° C. into a processing vessel, wherein said processing vessel is heated to a temperature in the range of 300° C. to 600° C. and wherein a pressure inside said processing vessel is 5 Tow or less; obtaining a distillate from said processing vessel, said distillate having a softening point in the range of 25° C. to 60° C. and being quinoline insoluble-free and ash-free; and heat treating said distillate at a temperature in the range of 370° C. to 595° C. for between three and forty hours.

7. A method according to claim 6, said feeding step comprising introducing said feed coal tar pitch into a wiped film evaporator, said wiped film evaporator comprising said processing vessel.

8. A method according to claim 6, said feeding step comprising introducing said feed coal tar pitch into a thin film evaporator, said thin film evaporator comprising said processing vessel.

9. A method according to claim 6, said feeding step comprising introducing said feed coal tar pitch into a conventional distillation apparatus, said conventional distillation apparatus comprising said processing vessel.

10. A method of making a quinoline insoluble-free and ash-free coal tar pitch, comprising of the steps of: feeding a feed coal tar pitch having a softening point in the range of 70° C. to 160° C. into a first processing vessel, wherein said first processing vessel is heated to a temperature in the range of 300° C. to 600° C. and wherein a pressure inside said first processing vessel is 5 Torr or less; obtaining a distillate from said first processing vessel, said distillate having a softening point in the range of 25° C. to 60° C. and being quinoline insoluble-free and ash-free; heat treating said distillate at a temperature in the range of 350° C. to 595° C. for between five minutes and forty hours; distilling the heat treated distillate to obtain a pitch having a desired softening point; feeding said pitch having a desired softening point into a second processing vessel, wherein said second processing vessel is heated to a temperature in the range of 300° C. to 600° C.; and withdrawing an output coal tar pitch from said second processing vessel.

11. A method according-to claim 10, wherein said first processing vessel and said second processing vessel are the same vessel.

12. A method according to claim 11, wherein said first and second processing vessel is a wiped film evaporator.

13. A method according to claim 10, wherein said first processing vessel comprises a wiped film evaporator.

14. A method according to claim 10, wherein said second processing vessel comprises a wiped film evaporator.

15. A method according to claim 11, wherein said first and second processing vessel is a thin film evaporator.

16. A method according to claim 10, wherein said first processing vessel comprises a thin film evaporator.

17. A method according to claim 10, wherein said second processing vessel comprises a thin film evaporator.

18. A method according to claim 11, wherein said first and second processing vessel are comprised of a conventional distillation apparatus.

19. A method according to claim 10, wherein said first processing vessel further comprises a conventional distillation apparatus.

20. A method according to claim 10, wherein said second processing vessel further comprises a conventional distillation apparatus.

21. A method of making a quinoline insoluble-free and ash-free hydrocarbon mixture pitch having a desired softening point, comprising the steps of feeding a feed hydrocarbon mixture pitch having an initial softening point in the range of 70° C. to 160° C. into a processing vessel, wherein said processing vessel is heated to a temperature in the range of 300° C. to 600° C. and wherein a pressure inside said processing vessel is 5 Torr or less; obtaining a distillate from said processing vessel, said distillate having a softening point in the range of 25° C. to 60° C. and being quinoline insoluble-free and ash-free; heat treating said distillate at a temperature in the range of 350° C. to 595° C. for between five minutes and forty hours; and distilling the heat treated distillate to obtain a pitch having the desired softening point.

22. A method according to claim 21, said feeding step comprising introducing said feed hydrocarbon mixture pitch into a wiped film evaporator, said wiped film evaporator comprising said processing vessel.

23. A method according to claim 21, said feeding step comprising introducing said feed hydrocarbon mixture pitch into a thin film evaporator, said thin film evaporator comprising said processing vessel.

24. A method according to claim 21, said feeding step comprising introducing said feed hydrocarbon mixture pitch into a conventional distillation apparatus, said conventional distillation apparatus comprising said processing vessel.

25. A method according to claim 21, wherein said heat treated distillate has a softening point in the range of 60° C. to 110° C.

26. A method according to claim 21, said feed hydrocarbon mixture pitch comprising a mixture of coal tar pitch and petroleum pitch.

27. A method according to claim 26, said feed hydrocarbon mixture pitch comprising at least 50% coal tar pitch.

28. A method of making a mesophase hydrocarbon mixture pitch, comprising of the steps of: feeding a feed hydrocarbon mixture pitch having a softening point in the range of 70° C. to 160° C. into a processing vessel, wherein said processing vessel is heated to a temperature in the range of 300° C. to 600° C. and wherein a pressure inside said processing vessel is 5 Torr or less; obtaining a distillate from said processing vessel, said distillate having a softening point in the range of 25° C. to 60° C. and being quinoline insoluble-free and ash-free; and heat treating said distillate at a temperature in the range of 370° C. to 595° C. for between three and forty hours.

29. A method according to claim 28, said feeding step comprising introducing said feed hydrocarbon mixture pitch into a wiped film evaporator, said wiped film evaporator comprising said processing vessel.

30. A method according to claim 28, said feeding step comprising introducing said feed hydrocarbon mixture pitch into a thin film evaporator, said thin film evaporator comprising said processing vessel.

31. A method according to claim 28, said feeding step comprising introducing said feed hydrocarbon mixture pitch into a conventional distillation apparatus, said conventional distillation apparatus comprising said processing vessel.

32. A method according to claim 28, said feed hydrocarbon mixture pitch comprising a mixture of coal tar pitch and petroleum pitch.

33. A method according to claim 32, said feed hydrocarbon mixture pitch comprising at least 50% coal tar pitch.

34. A method of making a quinoline insoluble-free and ash-free hydrocarbon mixture pitch, comprising of the steps of: feeding a feed hydrocarbon mixture pitch having a softening point in the range of 70° C. to 160° C. into a first processing vessel, wherein said first processing vessel is heated to a temperature in the range of 300° C. to 600° C. and wherein a pressure inside said first processing vessel is 5 Torr or less; obtaining a distillate from said first processing vessel, said distillate having a softening point in the range of 25° C. to 60° C. and being quinoline insoluble-free and ash-free; heat treating said distillate at a temperature in the range of 350° C. to 595° C. for between five minutes and forty hours; distilling the heat treated distillate to obtain a pitch having a desired softening point; feeding said pitch having a desired softening point into a second processing vessel, wherein said second processing vessel is heated to a temperature in the range of 300° C. to 600° C.; and withdrawing an output hydrocarbon mixture pitch from said second processing vessel.

35. A method according to claim 34, wherein said first processing vessel and said second processing vessel are the same vessel.

36. A method according to claim 35, wherein said first and second processing vessel is a wiped film evaporator.

37. A method according to claim 34, wherein said first processing vessel comprises a wiped film evaporator.

38. A method according to claim 34, wherein said second processing vessel comprises a wiped film evaporator.

39. A method according to claim 35, wherein said first and second processing vessel is a thin film evaporator.

40. A method according to claim 34, wherein said first processing vessel comprises a thin film evaporator.

41. A method according to claim 34, wherein said second processing vessel comprises a thin film evaporator.

42. A method according to claim 35, wherein said first and second processing vessel are comprised of a conventional distillation apparatus.

43. A method according to claim 34, wherein said first processing vessel further comprises a conventional distillation apparatus.

44. A method according to claim 34, wherein said second processing vessel further comprises a conventional distillation apparatus.

45. A method according to claim 34, said feed hydrocarbon mixture pitch comprising a mixture of coal tar pitch and petroleum pitch.

46. A method according to claim 45, said feed hydrocarbon mixture pitch comprising at least 50% coal tar pitch.

* * * * *

UNITED STATES PATENT AND TRADEMARK OFFICE
CERTIFICATE OF CORRECTION

PATENT NO. : 7,033,485 B2  Page 1 of 1
APPLICATION NO. : 09/853372
DATED : April 25, 2006
INVENTOR(S) : William E. Saver et al.

It is certified that error appears in the above-identified patent and that said Letters Patent is hereby corrected as shown below:

Column 9, Line 45
Claim 6, delete "Tow" and insert therefor --Torr--.

Signed and Sealed this

Thirty-first Day of October, 2006

JON W. DUDAS
*Director of the United States Patent and Trademark Office*